United States Patent
Ogoshi et al.

(12)
(10) Patent No.: US 6,237,346 B1
(45) Date of Patent: May 29, 2001

(54) METHOD FOR TRANSPORTING COLD LATENT HEAT AND SYSTEM THEREFOR

(75) Inventors: Hidemasa Ogoshi, Yokohama; Shingo Takao, Kuki; Shinichiro Fukushima, Yokohama, all of (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/406,217

(22) Filed: Sep. 27, 1999

(51) Int. Cl.⁷ .................................................. F25D 3/00
(52) U.S. Cl. .................................................. 62/4
(58) Field of Search ........................................ 62/4, 434

(56) References Cited

U.S. PATENT DOCUMENTS 3,243,966 * 4/1966 Glew .......................................... 62/4
4,051,888 * 10/1977 Yamada et al. ........................... 165/1
5,057,132 * 10/1991 Lebrun et al. ............................. 62/4

FOREIGN PATENT DOCUMENTS 10-259978    9/1998 (JP) .

* cited by examiner

Primary Examiner—William Doerrler
Assistant Examiner—Malik N. Drake
(74) Attorney, Agent, or Firm—Frishauf, Holtz, Goodman, Langer & Chick, P.C.

(57) ABSTRACT

A method for transporting cold latent-heat which comprises contacting a source of cold latent-heat with a liquid-liquid clathrate capable of crystallization when an onium salt having a $C_4H_9$ group and an iso-$C_5H_{11}$ group is included as a guest into basket-like inclusion clathrate lattices including water molecules.

13 Claims, 2 Drawing Sheets

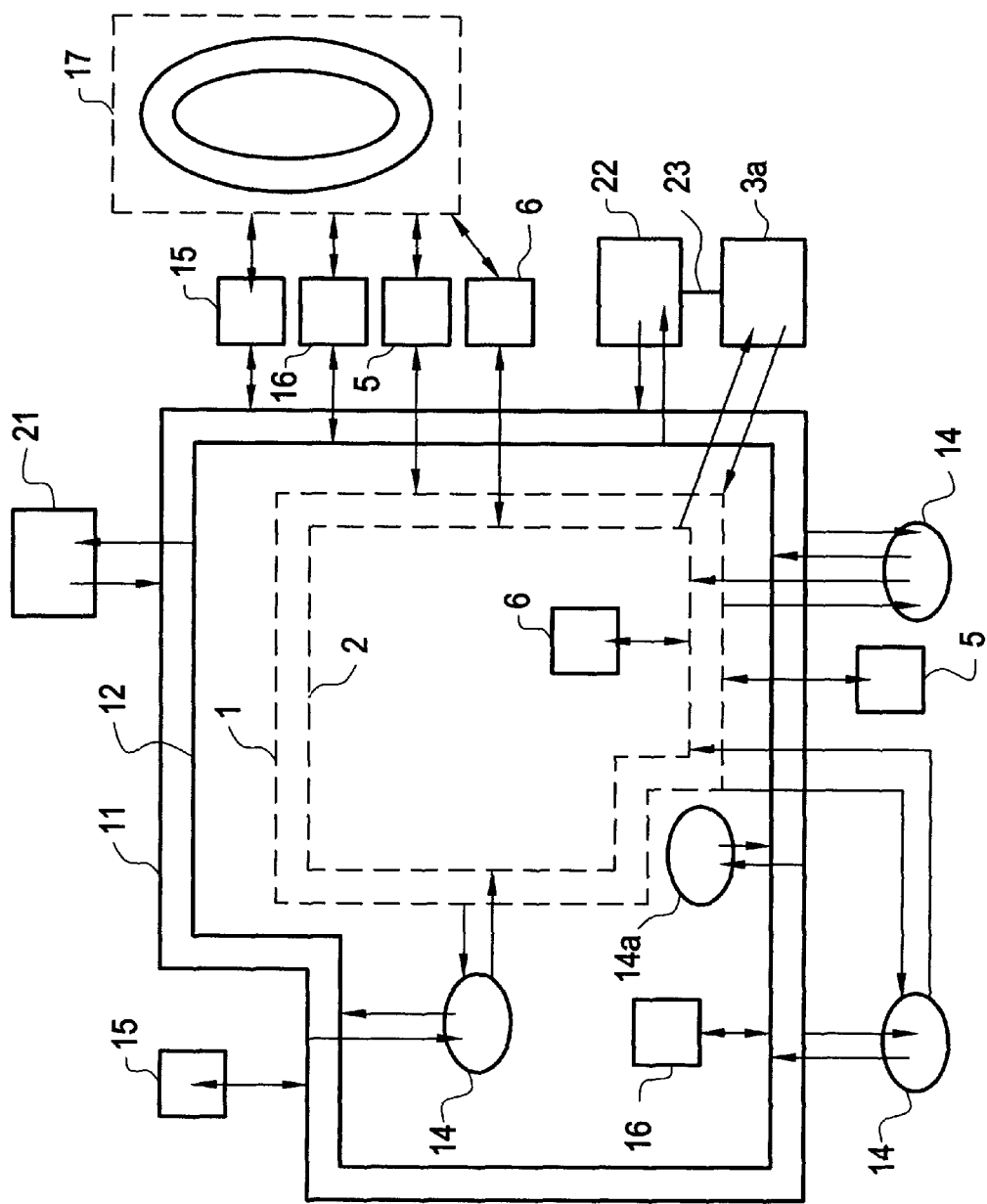

METHOD FOR TRANSPORTING COLD LATENT HEAT AND SYSTEM THEREFOR

BACKGROUND OF THE INVENTION

1. Field of the Invention

The present invention relates to a method for transporting cold latent heat and a system therefor.

2. Description of the Related Art

Conventionally, as a medium for transporting cold latent heat, there has been considered a gaseous hydrate.

Such kind of gaseous hydrate is called as a clathrate hydrate, which is a compound capable of crystallization when incorporating, as a guest, methane, ethane, propane, freon 11, freon 12 and some other gaseous molecules into basket-like lattices consisting of water molecules.

Then, such kind of gaseous hydrate has a crystallizing temperature (critical decomposing temperature) which is in a range of 5 to 20° C., a temperature higher that its freezing point. Further, its heat of formation is 70 to 90 cal/g which is close to the latent heat of ice. In view of the above physical properties, it has long been in discussion and consideration that people should make use of the characteristics of such gaseous hydrate so that it can serve as a regenerative medium for heat accumulation or act as a transporting medium for transporting cold latent heat.

However, it has been well know that freonic hydrates serving as primary components forming the above gaseous hydrate are associated with a problem of polluting the surrounding environment, such as a problem of destroying the ozone layer. Moreover, since the gaseous hydrates are associated with an extremely high pressure at their critical decomposing temperatures, and sometimes require the use of a vacuum pressure, such gaseous hydrates are difficult to be put into practical use.

SUMMARY OF THE INVENTION

It is an object of the present invention to provide a method for transporting cold latent-heat, so as to solve the problem of polluting the surrounding environment.

A method for transporting cold latent-heat according to the present invention is characterized in that a cold transporting medium for use in the method is a semi-clathrate hydrate (liquid-liquid clathrate) capable of crystallization when an onium salt having $C_4H_9$ group and iso-$C_5H_{11}$ group is included as a guest into basket-like clathrate lattices consisting of water molecules.

Here, the onium salt is an ammonium salt, a phosphonium salt, or a sulfonium salt. Further, with the semi-clathrate hydrate (which is also called a liquid-liquid clathrate, or liquid-liquid clathrate hydrate), since the guest is not in a gaseous state, the crystalline structure of the hydrate is more complex than that of a gaseous hydrate.

Moreover, the above semi-clathrate hydrate is characterized in that the guest is tetra n-butyl ammonium bromide ($[CH_3(CH_2)_3]_4NBr$, abbreviated as: TBAB). However, it is also possible to use another tetra n-butyl ammonium salt in which the above bromine (Br) may be replaced by F, Cl, $CHO_4$, $CH_3CO_2$, $HCO_3$, OH, $NO_3$, $CrO_3$, or $WO_4$.

Further, a cold latent heat transporting system comprises a pipeline for supplying a semi-clathrate hydrate to a plurality of equipments which include heat exchangers and require cold latent heat; a pipeline for recovering into at least one clathrate formation apparatus a medium which is formed by absorbing heat so that the hydrate is partially or completely changed into a liquid.

Moreover, each of the pipeline for supplying a liquid-liquid clathrate and the pipeline for recovering the clathrate into a clathrate regenerating apparatus, is connected with a storage container.

On the other hand, the melting point of the liquid-liquid clathrate may be changed by adjusting the concentration of the guest, corresponding to an amount of heat for use in equipment in which cold latent heat is needed.

Furthermore, at least one of the clathrate formation apparatus is a heat drive type refrigerating machine such as an absorption refrigerating machine and an adsorption refrigerating machine, wherein steam of a middle temperature to a low temperature and warm water are used as a heat source for the refrigerating machine.

In addition, the cold latent heat transporting system is provided together with an absorbing type air dehumidifying system, wherein exhaust heat from the steam absorbing type refrigerating machine is used as a heat source for regenerating the absorptive solution from the absorbing type dehumidifying system.

BRIEF DESCRIPTION OF THE DRAWINGS

FIG. 2 is a schematic drawing indicating an example of an entire constitution of equipment for carrying out the method of the present invention.

DESCRIPTION OF THE PREFERRED EMBODIMENTS

Figure 1:
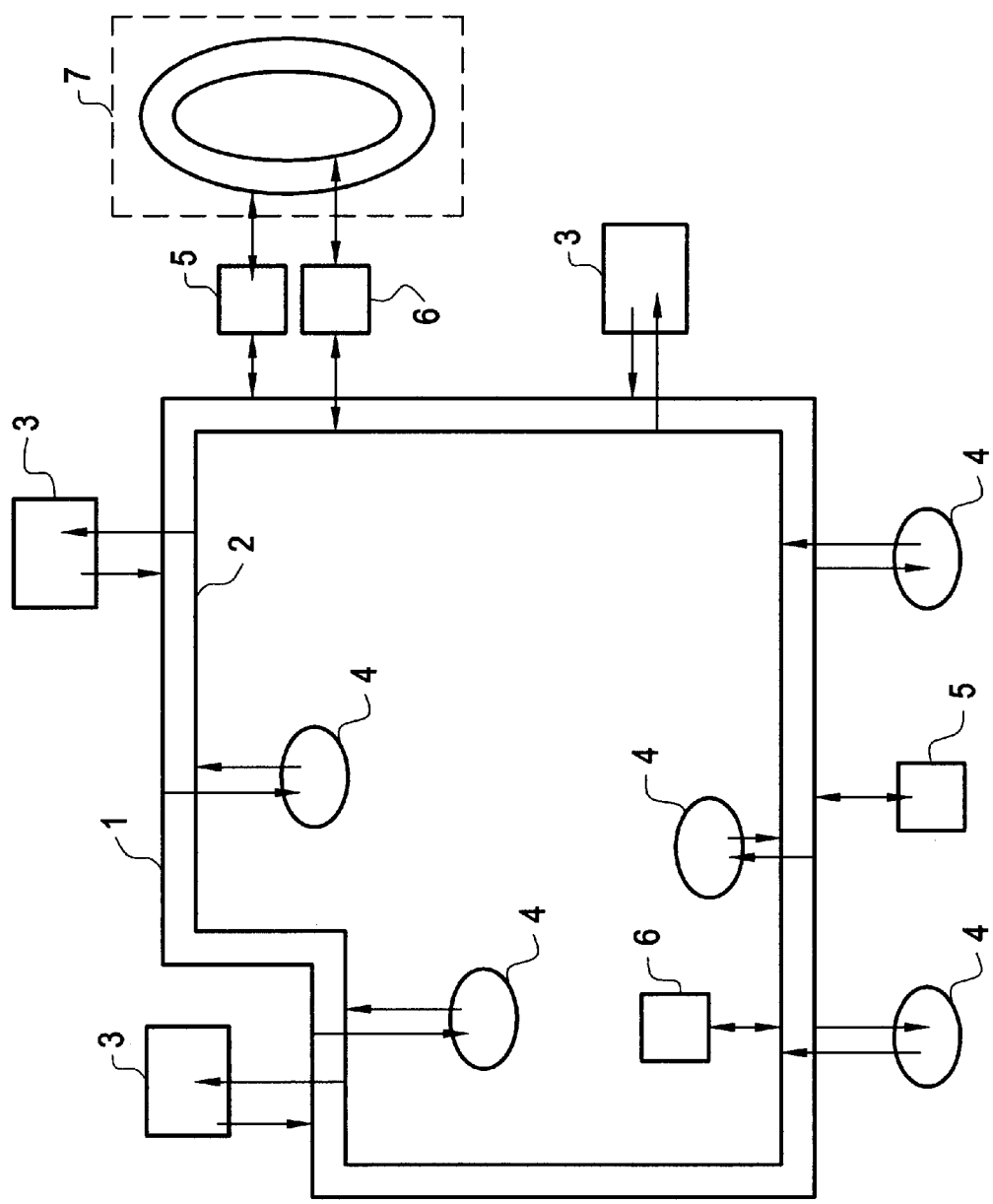
FIG. 1 is a schematic drawing indicating an example of an entire constitution for carrying out the method of the present invention.

A method of the present invention will be described by an example where said method is applied to an iron works. An example of equipment necessary for use in the method is shown in FIG. 1.

A cold latent-heat transporting medium for use in the method of the present invention is a liquid-liquid clathrate which is water-tetra n-butyl ammonium bromide (water-TBAB series), and is characterized in that it can be easily formed under a condition of atmospheric pressure.

Then, the clathrate has a melting point of approximately 12° C. when it is at a concentration of about 40%, and has a melting heat of 40 to 50 kcal/kg. However, such kind of melting point is allowed to vary within a range of 0–12° C. by adjusting the concentration thereof.

In FIG. 1, reference numeral 4 is used to represent necessary equipment in which cold latent-heat is needed, which equipment may be an air compressor. Here, in order to save power required for effecting an air compression, an in-take air is cooled and cold latent-heat is needed for effecting such cooling treatment. In detail, the required cold latent-heat medium is supplied through a clathrate supplying pipeline 1.

Further, the equipment 4 is also used to supply a cold latent-heat, a aqueous solution melted herewith is recovered through a pipeline 2 so as to be moved into a cooling apparatus 3 in which the clathrate is manufactured.

Here, the cooling apparatus 3 may be, for example, a mechanical type refrigerating machine employing electricity, or an absorbing type refrigerating machine or an adsorption type refrigerating machine employing steam or warm water. As a heat source for obtaining the steam or warm water is made of a low quality heat source which had not been fully used in the past, such as a heat source recovered from an exhaust gas of a heating furnace.

Nevertheless, equipment in which cold latent-heat is needed, include not only the above air cooling apparatus associated with the air compressor, but also an air cooling apparatus associated with an air conditioning equipment.

However, in view of a timing deference possibly occurring in flow rates between the equipment 4 and the apparatus 3, there are provided a clathrate storage container 5 connected with the pipeline 1, and a aqueous solution storage container 6 connected with the pipeline 2.

Namely, when the low quality heat has been generated in a large amount, such kind of heat may be used to cool the aqueous solution, so as to manufacture the clathrate which is then stored in the storage container 5. Afterwards, if a clathrate is needed in a large amount, the clathrate stored in the storage container 5 can be used.

On the other hand, when the low quality heat is generated in only a small amount, while a large amount of clathrate is needed, a large amount of aqueous solution will be generated. The aqueous solution thus generated is then stored in the storage container 6.

Further, the pipeline 1 for supplying the clathrate and the pipeline 2 for recovering the melted aqueous solution, are connected with each other through the equipment 4 in which cold latent heat is needed and through the cooling apparatus 3 for manufacturing the clathrate.

The clathrate storage container 5 may be arranged between the cooling apparatus 3 and the supplying pipeline 1. The aqueous solution storage container 6 may be arranged between the cooling apparatus 3 and the pipeline 2 for recovering the melted aqueous solution. The clathrate storage container 5 and the aqueous solution storage container 6 may be joined into the clathrate and aqueous solution storage container.

Moreover, the pipeline 1 for supplying the clathrate and the pipeline 2 for recovering the melted aqueous solution, are arranged in parallel with each other and are disposed in circulation to the areas where the cold latent-heat is needed. Therefor, even in a broad large area, it is possible that interval distances between various equipment may be made short, thus allowing all the equipments requiring cold latent heat to be included in only one cycle circuit.

For this reason, it is possible to supply cold latent heat to all the equipment (requiring the cold latent heat) scattered over a broad and large area, with only a small equipment investment.

Nevertheless, the melting point of the clathrate for use in the present invention may be varied within a range of 0 to 12° C. by adjusting the concentration of a guest (TBAB). Therefore, with the equipment in which cold latent heat is needed, even when an amount of heat for use will be different due to the season and at different times, it is possible to obtain an optimum melting point for the clathrate in accordance with an actual amount of heat for use in the process.

Accordingly, although an amount of heat for use in the summer season will be different from that in the winter season, and an amount of heat for use in the daytime will be different from that at the night, it is possible to establish simplified system for manufacturing and transporting a cold latent heat, and to ensure that such cold latent heat may be manufactured with a reduced cost, by only adjusting the concentration of an identical cold medium.

Table 1 indicates a relationship between a concentration of the clathrate and an amount of usable heat, under a condition where the aqueous solution has a temperature of 20° C.

TABLE 1

| TBAB concentration | 0% | 40% | Remark |
|---|---|---|---|
| (1) Melting point | 0° C. | 12° C. | |
| (2) Melting heat | 80 kcal/kg | 45 kcal/kg | 20 − 0 = 20 deg |
| (3) Latent heat | 20 kcal/kg | 8 kcal/kg | 20 − 12 = 8 deg |
| Usable heat amount | 100 kcal/kg | 53 kcal/kg | (2) + (3) |

Although the clathrate supply pipeline is fixed and the flow rate is constant, it is still possible to vary a heat supplying amount within a range of 1:2.

In general, equipment for manufacturing, consuming and transporting the cold latent-heat may be set to their maximum efficient points under a certain flow rate, thereby obtaining an optimum running condition.

For this reason, by virtue of the concentration adjustment in accordance with an actually needed amount of energy, it is possible to run the system under the optimum condition.

However, in FIG. 1, reference numeral 7 is used to represent another pipeline for supplying the clathrate and a further pipeline for supplying the melted aqueous solution.

Then, with reference to FIG. 2, a description is provided for an example where the cooling apparatus capable of manufacturing the clathrate is a refrigerating machine of a steam absorbing type, and an air dehumidifying system of an absorbing type is provided together with a cold latent-heat transporting system.

Here, as to pipelines for supplying the liquid clathrate and pipelines for supplying the melted aqueous solution, further, as to storage containers for storing the clathrate and aqueous solution, some elements identical with those in FIG. 1 are represented by the same reference numerals, and similar explanations thereof will be omitted.

Here, a cooling apparatus 3a for manufacturing the clathrate is a refrigerating machine of a steam absorbing type. As a heat source for use in the refrigerating machine, one of several steams from a middle temperature steam to a low temperature steam can be used which had not been fully used in the past in iron works.

A reference numeral 14 is used to represent equipment which requires both cold latent heat and a heat source for use in a dehumidifying system. For instance, it is equipment having an air compressor for compressing air. Such equipment requires cold latent heat which is needed for cooling intake air in order that compressing power may be reduced, and is provided with an absorbing type dehumidifying system capable of removing moisture so as to avoid a problem that drainage will happen from cooled air and will hence undesirably bring about a harmful influence to the compressor. Further, it is equipment in which a heat source is needed for the regeneration of an absorptive liquid.

The absorptive liquid for absorbing moisture from the air is an aqueous solution having a high moisture absorbing capability, such as a lithium chloride solution and an ethylene glycol solution. These aqueous solutions are each capable of absorbing moisture at a high absorbing concentration. The aqueous solution whose concentration has become low after the moisture has been absorbed thereinto, may be regenerated by adding heat thereinto so as to remove a water content therefrom, thereby obtaining an absorptive liquid having a high concentration and thus making it possible to reuse the solution as an absorptive liquid.

In the drawing, reference numeral 11 is used to represent a pipeline for supplying the above high concentration absorptive liquid; reference numeral 12 is used to represent a pipeline for recovering the absorptive liquid whose concentration has become low.

The equipment 14 is connected with the pipelines 11 and 12, so that it is possible to supply the high concentration absorptive liquid and to recover the absorptive liquid whose concentration has become low. However, towards the equipment 14, a liquid-liquid clathrate is supplied from the pipeline 1, meanwhile a melted aqueous solution is recovered by way of the pipeline 2.

Nevertheless, equipment 14a has only a dehumidifying apparatus, and is connected only with the pipelines 11 and 12.

The absorptive liquid whose concentration has become low, is regenerated in a regeneration apparatus 22 so as to obtain a high concentration, using as a heat source an exhaust heat or a low pressure steam supplied from the steam absorbing type refrigerating machine 3a by way of a pipeline 23. Further, the absorptive liquid is also regenerated in a regeneration apparatus 21, with the use of warm water having a temperature of 100° C. or lower which is recovered from an exhaust heat source coming from a plant.

Nevertheless, in view of a timing deference in flow rates, similar to the pipelines 1 and 2, there are provided clathrate storage containers 15 and 16 (for storing the high concentration absorptive liquid and the absorptive liquid whose concentration has become low) which are connected with the pipelines 11 and 12.

Further, reference numeral 17 is used to represent equipment including pipelines for supplying and recovering the clathrate, also including pipelines for transporting the high concentration liquid for absorbing the moisture and for transporting the low concentration liquid.

Then, the clathrate supply pipeline 1, the melted aqueous solution recovering pipeline 2, the high concentration absorptive liquid supplying pipeline 11 and the low concentration absorptive liquid supplying pipeline 12, are all connected together through the equipment 14 (requiring cold latent heat and a heat source for use in the dehumidifying system), the cooling apparatus 3a (for manufacturing the clathrate) and the regeneration apparatus 22 (for regenerating the moisture absorbing liquid).

In this way, the clathrate supplying pipeline, the melted aqueous solution recovering pipeline, the high concentration moisture absorbing liquid pipeline, and the low concentration absorptive liquid pipeline are arranged to be parallel with one another, and are disposed in circulation to the areas where the cold is needed. Therefor, even in a broad large area, it is possible that interval distances between various equipment may be made short, allowing all the equipment requiring the cold latent heat and all the equipment requiring the absorptive liquid (for use in the above air dehumidification) to be included in only one cycle circuit.

For this reason, with only a small equipment investment, it is possible to supply cold latent heat to all the equipment (requiring the cold latent heat) scattered over a broad and large area, and to supply an absorptive liquid to the equipment requiring an absorptive liquid (for use in the above air dehumidification).

Since the clathrate used in the present invention is easy to be produced under a condition of atmospheric pressure, the handling thereof is simple.

Further, it will not cause any problem such as an environment problem which would otherwise occur due to freon, as associated with a gaseous clathrate.

Moreover, since its heat of fusion is 40 to 50 kcal/kg, exhibiting a high density, when compared with a case where water is used, it is found that its capability for heat transportation has been increased to four times and that the diameter of a pipeline for its transportation is reduced to a half.

Further, its melting point is varies within a range of 0 to 12° C., corresponding to its concentration. With respect to a desired cooling temperature required by a certain object to be cooled, it has become possible that the cold latent heat may be manufactured with a reduced cost as compared with a case where ice-water slurry is used.

Moreover, since the manufacturing of the cold latent heat and the regeneration of the absorptive liquid may be conducted in the same place, steam energy needed in a cold latent heat manufacturing process may be more effectively used to tis maximum extent.

In this way, when the dehumidifying system using a moisture absorbing liquid (an absorptive liquid), the system for regenerating the absorptive liquid, and the apparatus for manufacturing cold latent heat from a liquid-liquid clathrate, are connected together by means of a pipeline network, it will be possible to establish an improved system capable of making use of heat with a higher efficiency.

What is claimed is:

1. A method for transporting cold latent-heat, comprising contacting a source of cold latent-heat with a semi-clathrate hydrate, as a cold latent-heat medium, capable of crystallization when an onium salt having a $C_4H_9$ group and an iso-$C_5H_{11}$ group is included as a guest into basket-like clathrate lattices including water molecules in the semi-clathrate hydrate.

2. The method of claim 1, wherein the semi-clathrate hydrate is water-tetra n-butyl ammonium bromide.

3. The method of claim 1, further comprising adjusting the concentration of the guest, corresponding to an amount of heat for use in equipment in wich cold latent-heat is needed and changing the melting point of the semi-clathrate hydrate.

4. The method of claim 1, wherein the onium salt is selected from the group consisting of an ammonium salt, a phosphonium salt and a sulfonium salt.

5. The method of claim 1, wherein the guest is a tetra n-butyl ammonium salt having an anion selected from the group consisting of Br, F, Cl, $CHO_4$, $CH_3CO_2$, $HCO_3$, OH, $NO_3$, $CrO_3$ and $WO_4$.

6. A system for transporting cold latent-heat, comprising:
   a supply pipeline for supplying a semi-clathrate hydrate to a plurality of equipment which include at least one heat exchanger and require cold latent-heat; and
   a recovery pipeline for recovering into at least one clathrate formation apparatus a medium which is formed by absorbing heat so that the semi-clathrate hydrate is at least partially changed into a liquid.

7. The system of claim 6, further comprising a storage container which is connected to the supply pipeline or the recovery pipeline.

8. The system of claim 6, wherein said at least one clathrate formation apparatus is a heat drive refrigerating machine which uses steam at a temperature from a middle temperature to a low temperature or warm water as a heat source for the refrigerating machine.

9. The system of claim 8, further comprising an absorbing air dehumidifying system, wherein exhaust heat from the heat drive refrigerating machine is used as a heat source for regenerating an absorptive solution from the absorbing air dehumidifying system.

10. The system of claim 9, wherein the absorptive solution is selected from the group consisting of a lithium chloride solution and an ethylene glycol solution.

11. The system of claim 6, wherein said at least one clathrate formation apparatus is a mechanical refrigerating machine which uses electricity.

12. The system of claim 6, wherein the semi-clathrate hydrate comprises a guest which is a tetra n-butyl ammonium salt having an anion selected from the group consisting of Br, F, Cl, $CH_4$, $CH_3CO_2$, $HCO_3$, OH, $NO_3$, $CrO_3$ and $WO_4$.

13. The system of claim 6, wherein the semi-clathrate hydrate comprises a guest which is n-butyl ammonium bromide.

* * * * *